United States Patent [19]

Leon

[11] 4,349,931
[45] Sep. 21, 1982

[54] THREADING DIE COUPLE

[76] Inventor: Harry I. Leon, 924 Bowen St., NW., Atlanta, Ga. 30318

[21] Appl. No.: 153,083

[22] Filed: May 27, 1980

[51] Int. Cl.$^3$ .............................................. B23G 5/04
[52] U.S. Cl. ................................ 10/123 P; 269/131; 269/168; 408/121; 408/138
[58] Field of Search ................ 10/111, 123 R, 123 P, 10/123 S; 269/249, 902, 130–132, 282, 168, 43, 209; 408/92, 101, 102, 104, 121, 138, 238, 241, 239; 29/240, 240.5, 237; 181/462

[56] References Cited

U.S. PATENT DOCUMENTS

| | | | |
|---|---|---|---|
| 705,932 | 7/1902 | Kennedy | 269/209 |
| 1,783,713 | 12/1930 | Holman | 269/207 X |
| 2,168,126 | 8/1939 | Kane | 269/130 X |
| 2,492,783 | 12/1949 | Chamberlain | 269/130 X |
| 2,549,820 | 4/1951 | Kinzle | 29/281.1 X |
| 2,551,652 | 5/1951 | Vreeland | 29/237 X |
| 2,821,775 | 2/1958 | Pauelka | 29/237 |
| 2,916,812 | 12/1959 | Milo | 29/237 |
| 3,675,303 | 7/1972 | McKinnon | 269/131 |
| 4,083,624 | 4/1978 | Timmer | 269/249 |

Primary Examiner—Nicholas P. Godici
Attorney, Agent, or Firm—V. L. Leon

[57] ABSTRACT

A tool couple which is used with a manually-operated threading die to aid in cutting the initial threads on a pipe or bolt. The device is used to force the anterior cutting edge of the die firmly against the outer, unthreaded surface of the workpiece at the outset of a threading operation. The die is kept wedged, as the initial threads are being cut, between the workpiece and a rotatable member of the tool couple so that the die cannot slip backward toward the leading edge of the workpiece. To keep the die so wedged, the rotatable member is advanced in the direction of the end of the workpiece at approximately the same rate as the die is moved along the longitudinal axis of the workpiece. By maintaining the anterior cutting edge of the die in juxtaposition to the advancing edge of the thread, the device prevents a chamfering of the leading edge of the workpiece as the threading die is turned. The rotatable member, which rotates at substantially the same rate as the die, dissipates torque developed during the threading operation which would otherwise tend to twist the frame of the tool couple. The frame is pivotally connected to the tail-piece of a base which may be attached to the workpiece itself; alternately, the base may be bolted to a work bench on which a bench chain vise is mounted. The frame can be swung out of the way once sufficient threads have been cut on the end of the workpiece to hold the threading die in place without additional support.

12 Claims, 15 Drawing Figures

THREADING DIE COUPLE

BACKGROUND OF THE INVENTION

1. Field of the Invention

This invention relates generally to tool couple elements and in particular to those attached to a vise for holding a threading die in contact with a workpiece while the die is used to thread the end of the workpiece.

2. Description of the Prior Art

The cutting of the initial thread on a pipe in a manual operation requires the operator to push the die onto the pipe while simultaneously turning the die handle. This operation is at times a very difficult and awkward task because a large amount of pressure must, on occasion, be exerted on the die against the pipe in order to cut the initial threads. Moreover, if the initial attempt to form a thread is unsuccessful, the operator usually finds that successive attempts are also unsuccessful; the die merely continues to cut a steep chamfer or bevel on the leading edge of the pipe.

To remedy such a situation, those operators fortunate enough to have a grinding wheel close at hand fashion a slight taper on the outer surface of the pipe so that the cutting edges behind the anterior cutting edge of the die, as well as the latter edge, are engaged in the initial cutting action. However, the operation of shaping a taper is time-consuming and often impractical.

Too frequently, frustrated operators resort to hammering a die onto the end of a pipe in order to start the die. Such hammering usually destroys an expensive tool, the threading die.

The awkwardness of the process of trying to press the die inward and to rotate the die handle simultaneously is further compounded when one attempts to thread the end of an installed pipe. In the past, most operators have elected to wrench out the section of pipe which must be cut and re-threaded and to work on that section in a place where the pipe can be secured close to the end to be threaded. The pipe-fitting activity associated with removing the entire pipe section can be time-consuming and costly, especially when the joint connecting the pipe section to other pipe is relatively inaccessible or the threads of the joint have become chemically bonded to one another by rusting or other chemical action.

SUMMARY OF THE INVENTION

In accordance with the present invention, there is provided a tool couple for pushing a threading die onto the unthreaded outer surface of a cylindrical workpiece without damaging the cutting edges of the die and for subsequently maintaining sufficient force on the die to prevent it from slipping as it is turned to cut the initial threads in the workpiece. This tool couple comprises a frame with an elongated arm and a means for moving a shaft which supports a rotatable member in a direction parallel to the longitudinal axis of the elongated arm. Points on the rotatable member are adapted for physical contact with the threading die so that a force applied to the tool couple can be transmitted through the frame of the threading die to points on the cutting edges thereof which are in contact with the workpiece.

The tool couple further comprises a means for constraining the rotatable member to rotate about the longitudinal axis of the shaft. The rotatable member, which rotates at substantially the same rate as the threading die, dissipates torque developed during the threading operation which would otherwise tend to twist the frame of the tool couple.

The elongated arm of the tool couple is pivotally connected to a tailpiece. The pivotal connection allows the arm to be swung out of the way once sufficient threads have been cut on the end of the workpiece to hold the threading die in place without additional support.

The tool couple further comprises a means for anchoring the tailpiece in a fixed position relative to the workpiece, so that the longitudinal axes of the arm and of the workpiece can be aligned substantially parallel to each other. When the workpiece to be threaded can be easily transported to a work bench, a tool couple with a mounting bracket to which the tailpiece is rigidly attached and having a generally flat surface, the area of which is substantially greater than the axial cross-section of the tailpiece lying in any plane which is generally parallel to the flat surface, is provided. Such a mounting bracket is adapted to be bolted to the underside of a work bench on the upper surface of which a bench chain vise or similar pipe vise has been mounted.

There is also disclosed a tool couple in which the tailpiece is rigidly attached to the body of a pipe vise. The pipe vise has jaw teeth which line a V-shaped trough formed as a depression in the chain vise body. The jaw teeth are adapted to contact the workpiece. Two alternate embodiments of such a tool couple are provided. In the first of these alternate embodiments, the jaw teeth are detachable; the ridges of the jaw teeth are disposed in a direction which is generally perpendicular to the gradient of the side of the trough to which the ridge is contiguous. This alignment of the ridges increases the amount of sliding friction between the jaw teeth and the workpiece when a torque is applied to the latter. The body of the pipe vise in this embodiment is bolted to the top of a work bench and, when the elongated arm of the tool couple is swung out of the way, can be utilized in the same manner as the body of a bench pipe vise which is well-known in the art.

In the second of the alternate embodiments in which the tailpiece is rigidly attached to the body of a pipe vise, the jaw teeth and the body comprise a single, unitary piece formed of metal. The jaw teeth again line a V-shaped trough; but the ridges of the jaw teeth formed in each intersecting, sloping side of the trough are disposed in a direction which is generally parallel to the gradient of the side so that a workpiece pressed against the jaw teeth encounters a substantial amount of sliding friction when subjected to a force parallel to the longitudinal axis of the workpiece. Such a force is transmitted when the tool couple is used to wedge the threading die against the workpiece. The bulk of the pipe vise body in this embodiment is disposed directly beneath the trough in order to minimize the weight of the tool couple and to enhance its portability.

A further alternate embodiment to aid in threading a newly-cut end formed in a section of installed piping is also provided. In this tool couple, the means for anchoring the tailpiece comprises an open-ended, adjustable clamp cylinder to which the tailpiece is rigidly attached. The cylinder has a slot adapted for the insertion and adjustment of clutch loops. The clutch loops, when positioned so that an opening in each loop is disposed vertically relative to the longitudinal axis of the cylinder, allow it to be slid along the workpiece a sufficient distance to allow space for the threading die to be used to thread the workpiece. When tilted relative to the same axis by a spring placed in the end of the cylinder proximate to the end of the workpiece to be threaded, the clutch loops grip the workpiece, thereby preventing any substantial movement of the cylinder toward the end to be threaded. Whereas the embodiments utilizing a chain vise to grip the workpiece are useable with workpieces having a wide range of sizes, the embodiments utilizing clutch loops are primarily designed for threading a large number of workpieces of a common outer diameter in rapid succession.

Further features of the invention include the design and arrangement of the rotatable member as well as its connection to the shaft.

BRIEF DESCRIPTION OF THE DRAWINGS

Further details are explained below with the help of the examples illustrated in the attached drawings in which:

FIG. 6 is an exploded view showing in perspective the same tool couple as in FIG. 2 except with a modified base upon which the workpiece can be mounted;

FIG. 7 is an enlarged bottom plan view of the modified base of FIG. 6;

FIG. 8 is an enlarged elevational view of the modified base of FIG. 6 and of a detachable chain and collar;

FIG. 9 is an enlarged top plan view of the modified base of FIG. 6;

FIGS. 10, 11, 12, and 13 show the same tool couple as in FIGS. 6–9 except with a modified base with a different design for securing the tool couple to the workpiece instead of the work bench; FIG. 12 is a perspective view of this further embodiment in which a section of the workpiece is superimposed as dashed lines; FIGS. 10, 11, and 13 are, respectively, the perspective, top plan, and bottom plan views of the modified base;

FIG. 14 is a perspective view of a still further embodiment of the present invention in which a section of a workpiece is superimposed as dashed lines; and FIG. 15 is an enlarged perspective view of the base of the embodiment shown in FIG. 14.

DESCRIPTION OF THE PREFERRED EMBODIMENT

Figure 1:
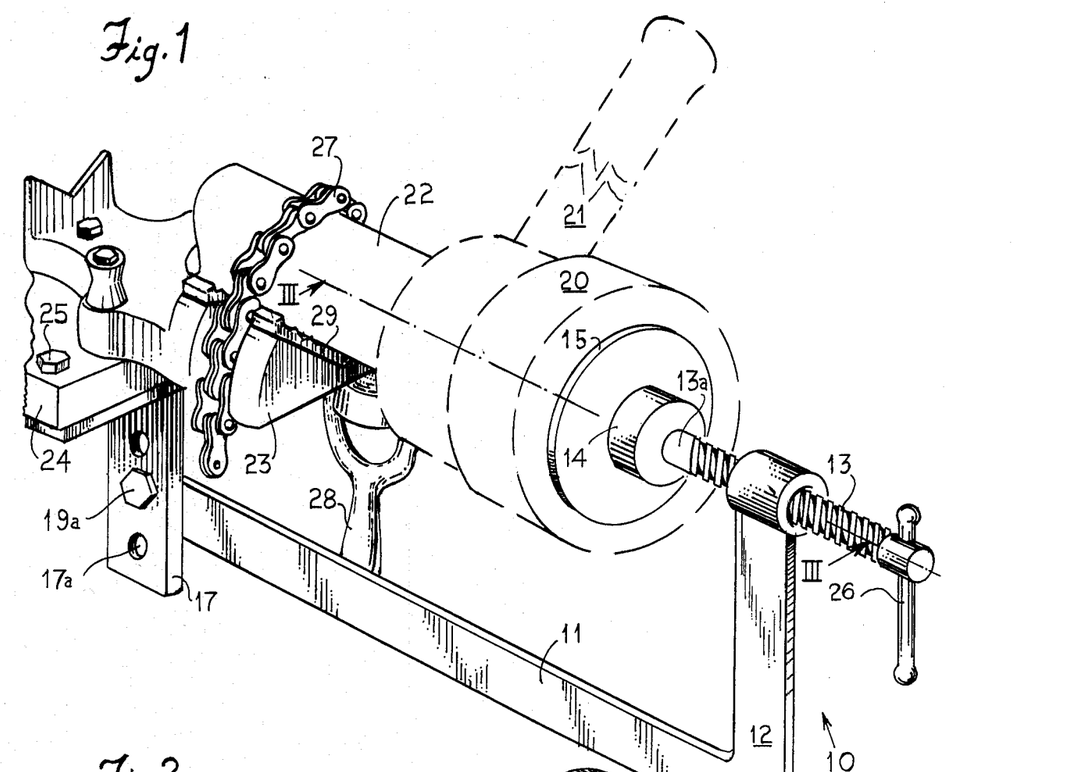
FIG. 1 is a perspective view of one embodiment of the present invention in which the tool couple is bolted to a work bench, the tool couple being applied in a position to wedge the cutting edges of a threading die against the outer surface of a workpiece to be threaded.
Figure 3:
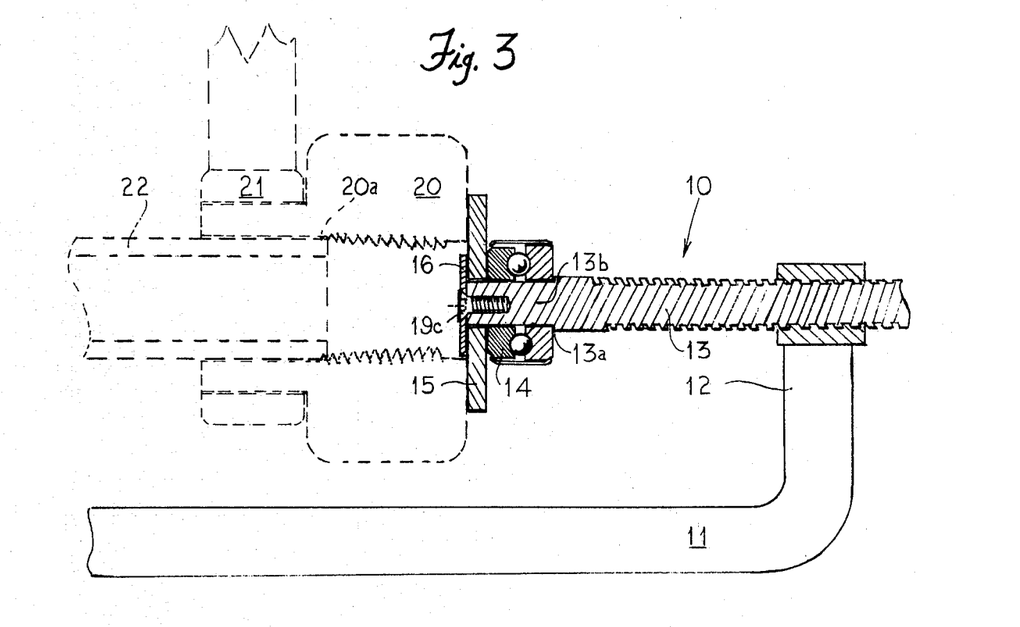
FIG. 3 is an enlarged cross-sectional view taken on line III—III of FIG. 1 in which the cross-sections of the threading die, of the die handle, and of the workpiece are superimposed as dashed lines.

In the drawings, a tool couple 10 incorporating the present invention is shown holding a threading die 20 in contact with a workpiece such as a pipe 22 (FIGS. 1 and 3). As illustrated in FIG. 3, the portion of the threading die 20 which abuts upon the pipe 22 comprises the cutting edges. The die 20 has been slid over the leading edge of the pipe 22 and a short distance along the unthreaded outer surface thereof until the anterior cutting edge 20a begins to scrape the outer surface (FIG. 3).

Figure 2:
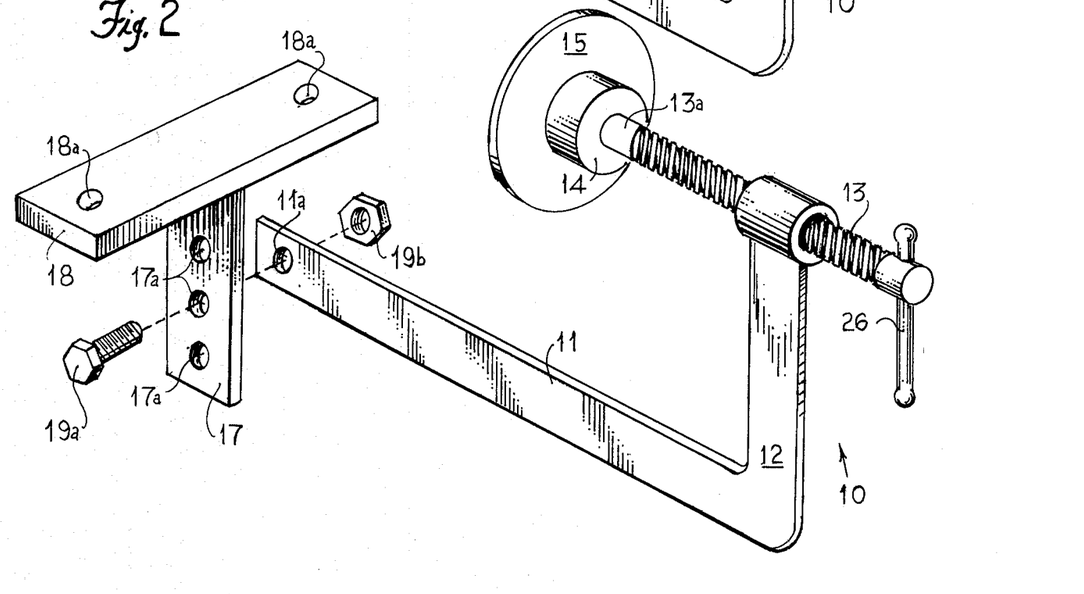
FIG. 2 is an exploded view showing in perspective the tool couple parts shown in assembled form in FIG. 1.

In the preferred embodiment shown in FIGS. 1–3, the tool couple 10 has a frame 12 with an elongated arm 11. The frame 12 is preferably formed of a material such as ductile iron or the like. The elongated arm is pivotally connected to a tailpiece 17 which extends generally downwardly from a means for anchoring it in a fixed position relative to the pipe 22. In the tool couple 10, the means for anchoring the tailpiece comprises a mounting bracket 18 which is rigidly attached to the tailpiece 17 as described hereinbelow.

The tool couple 10 further comprises a shaft 13 threadedly engaged with the frame 12 and having a shoulder 13a to form a means for moving a rotatable member in a direction parallel to the longitudinal axis of the elongated arm 11. The shaft 13 may be formed of any of several steel alloys including low carbon steel, ductile iron, and tool steel. In the embodiment shown in FIGS. 1–3, the rotatable member is formed of two parts, a thrust bearing 14 and a disk 15 in sliding contact therewith.

As is seen in FIG. 3, a means for constraining the rotatable member to rotate about the shaft 13 comprises a sleeve 13b formed in one end of the shaft 13, a washer 16, a screw 19c, and the shoulder 13a. The thrust bearing 14 and the disk 15 each have openings formed therein for receiving the sleeve 13b. The shoulder 13a, being at least a few thousandths of an inch larger in diameter than the cylindrical opening in the thrust bearing 14, cannot be inserted into it. The length of the sleeve 13b is approximately equal to the sum of the lengths of the openings in the disk 15 and in the thrust bearing 14. A hole with screw threads for receiving the screw 19c is formed in the sleeve 13b, the longitudinal axes of the hole and of the shaft 13 being generally parallel. The screw 19c preferably has a flat head cap with a hexagon socket and has threads of the National Fine Thread Series. By way of example, the screw 19c may have a basic major diameter of 3/16th inch and 32 threads per inch. The opening in the washer 16 is preferably tapered so that the screw 19c may be seated in it. The screw 19c is used to hold the washer 16, the disk 15, the thrust bearing 14, and the shaft 13 in assembled relation.

As is best seen in FIG. 2, the elongated arm 11 is pivotally connected to the tailpiece 17 by any appropriate means such as a bolt 19a and a nut 19b. Both the bolt 19a and the nut 19b preferably have threads of the National Fine Thread Series. By way of example, the bolt 19a may have a basic major diameter of 5/16th inch and 24 threads per inch. The elongated arm 11 and the tailpiece 17 each have at least one hole 11a and 17a, respectively, formed therein for receiving the bolt 19a. The nut 19b is used to hold the bolt 19a, the elongated arm 11, and the tailpiece 17 in assembled relation. The elongated arm 11 is pivotally connected to the tailpiece 17 so that the arm can be swung out of the way once sufficient threads have been cut on the end of the workpiece to hold the threading die 20 in place without additional support.

The longitudinal axes of the elongated arm 11 and of the pipe 22 are aligned generally parallel to each other and within approximately the same vertical plane when the tool couple is used during a threading operation (FIGS. 1 and 3). This requirement must be met when the mounting bracket is bolted to the underside of a work bench 24 on the upper surface of which any appropriate pipe vise such as a bench chain vise 23 or a yoke vise has been bolted.

To aid in positioning the disk 15 so that the horizontal centerlines of the shaft 13 and of the threading die 20 generally coincide for a range of pipe sizes, a plurality of holes 17a disposed along the vertical axis of the tailpiece 17 are provided (FIGS. 1 and 2). The tailpiece 17 is connected to the elongated arm 11 using whichever hole 17a provides the best alignment dependent upon the size of the pipe 22. By way of example, when the tool couple is used with a RIGID bench chain vise Model BC-2A (Trademark registered by The Ridge Tool Co., Elyria, Ohio), three holes 17a spaced approximately 7/16th inch apart provide adequate adjustment to align the disk 15 and the threading die 20 for nominal pipe sizes from ⅛th to 2 inch within the capacity of the chain vise.

The upper surface of the mounting bracket 18 is generally flat and substantially greater in area than any one of the axial cross-sections of the tailpiece 17 which lie in a plane which is generally parallel to the upper surface of the mounting bracket 18 (FIG. 2). Holes 18a are formed in the bracket to secure it to the bench 24 by means of the bolts 25.

The tailpiece 17 and the mounting bracket 18 are formed of a material such as low carbon steel, ductile iron, or the like and are rigidly attached to each other either by welding or by any appropriate mechanical fasteners such as screws. Alternately, the tailpiece and the mounting bracket may comprise a single, unitary piece formed of a steel alloy.

In operation, points on the disk 15 are in physical contact with the threading die 20 so that a force applied to a handle 26 which is slidably connected to the shaft 13 can be transmitted through the frame of the threading die 20 to points on the cutting edges, such as the cutting edge 20a, which are in contact with the pipe 22. The disk 15 rotates at substantially the same rate as the threading die 20 when the die is manually turned by means of the die handle 21. The thrust bearing 14 dissipates the torque developed in the threading operation which would otherwise tend to twist the frame 12.

To maintain contact between the disk 15 and the contiguous face of the threading die 20 as he turns the die, an operator must simultaneously turn the handle 26 to advance the rotatable member comprising the disk 15 and the thrust bearing 14. The operator can easily adjust the compressive force necessary to hold the die in position with the tool couple and easily release it when a sufficient number of threads have been cut on the end of the workpiece to hold the threading die in place without additional support.

Figure 4:
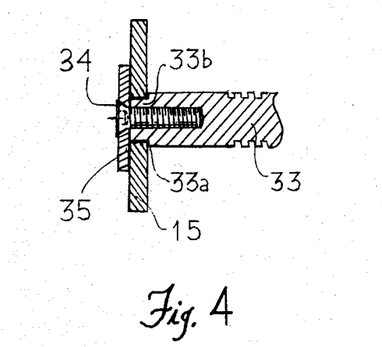
FIG. 4 is a cross-sectional view of the rotatable member and of the proximate end of the shaft of a further embodiment of the present invention.

An alternate embodiment of the present invention is shown in FIG. 4 in which the thrust bearing 14 has been eliminated in order to provide a lower cost tool couple. In contrast to the sleeve 13b, the sleeve 33b is substantially reduced in length bringing the disk 15 in physical contact with the shoulder 33a. The shoulder 33a is at least a few thousandths of an inch larger in diameter than the hole in the disk 15 into which the sleeve 33b is inserted. The remainder of the shaft 33 is similar to the shaft 13 with the exception of a larger hole for receiving the screw 34. The shaft of the screw 34 is preferably larger than that of the screw 19a in order to compensate for the increased torsional forces which may be exerted upon the head of the screw in the absence of a thrust bearing. A thicker washer 35 allows the tapered head of the screw 34 to be seated in the tapered opening of this washer.

Figure 5:
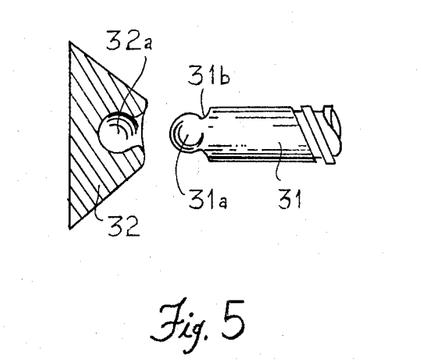
FIG. 5 is a cross-sectional view of the rotatable member and of an elevational view of the proximate end of the shaft of a further embodiment of the present invention.

A further embodiment of the present invention is shown in FIG. 5. In this embodiment, the thrust bearing 14 and the disk 15 have been replaced by a rotatable member 32. Further, the means of constraining the rotatable member 32 to rotate about the shaft 31 utilizes a ball and socket joint formed between the shaft 31 and the rotatable member 32, thus eliminating the need for the washer 16 and the screw 19c. A socket 32a is formed in the rotatable member 32; and one end of the shaft 31 is formed in the shape of a ball 31a and a neck 31b. The remainder of the shaft 31 is similar to the shaft 13. The radii of curvature of the socket 32a and of the ball 31a are substantially equal, but the radius of the socket 32a is slightly larger. The socket 32a has an opening slightly smaller than the diameter of the ball 31a so that is can be pressed through the opening to form a ball and socket joint. The rotatable member 32 as well as the shaft 31 is preferably formed of a material such as ductile iron, low carbon steel, or the like.

A further embodiment of the present invention is illustrated in FIGS. 6–9. In the tool couple 30, the mounting bracket 18 has been replaced with a body of a pipe vise such as the chain vise body 36 to which the tailpiece 37 is rigidly attached and from which it extends in a generally downwardly direction. The tailpiece 37 is disposed so that the vertical centerlines of the shaft 13 and of a workpiece secured to the chain vise body 36 generally coincide. Alternately, the tailpiece 37 may be rigidly attached to the body of a yoke vise or other pipe vise which has the capacity for use with a range of pipe sizes. By connecting a means for gripping the workpiece such as a chain 27 and the jaw teeth 29 to the same body to which the tailpiece 37 is attached, there is provided a tool couple 30 in which the longitudinal axes of the elongated arm 43 and of the workpiece can be readily brought into substantially parallel alignment with each other in approximately the same vertical plane merely by rotating the elongated arm 43 about the pivotal joint connecting it and the tailpiece 37.

Figures 6, 7, 8, 9, 10, 11:
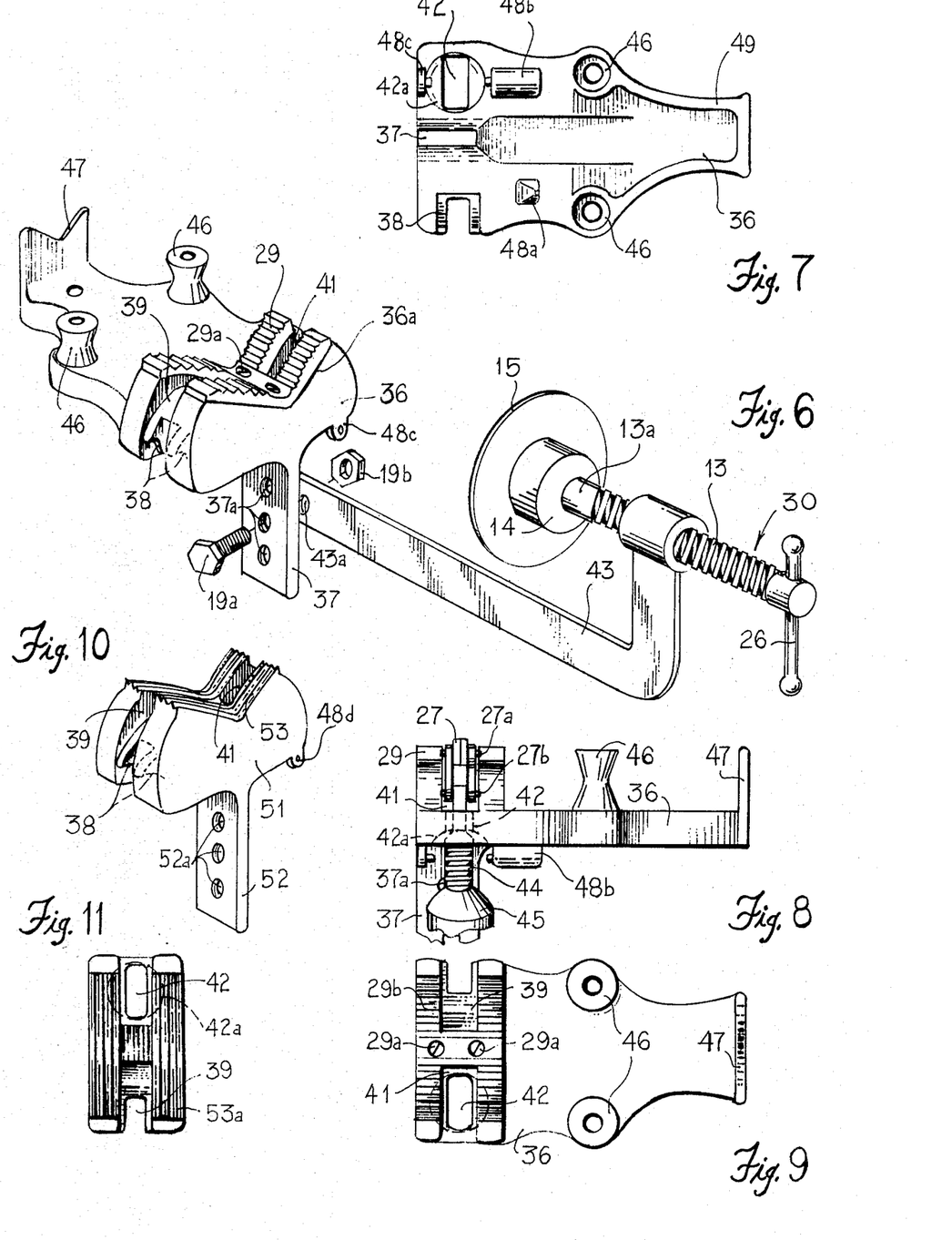

The tailpiece 37 and the chain vise body 36 may comprise a single, unitary piece formed of a material such as ductile iron, drop-forged steel, or the like. Alternately, the tailpiece 37 and the chain vise body 36 may be welded to each other.

With the exception of the tailpiece 37, the chain vise body 36 is similar to the body of the bench chain vise 23. In each, a detachable chain 27 is secured to the chain vise body. As is best seen in FIG. 8, one end of the chain 27 is pivotally connected by a pin 27b to an end of the threaded bar 44. The opposite end of the bar 44 is inserted into an elongated opening 42 disposed beneath the slot 41 and extends downwardly from the chain vise body 36 (FIG. 8).

The elongated arm 43 is similar to the elongated arm 13 except that the distance between the center of the hole 43a and the centerline of the shaft 13 is reduced in order to compensate for the closer coupling between the means for securing a pipe and the tailpiece 37. In addition, the holes 37a are of the same size as the holes 17a; and the centers of the holes 37a are separated from each other by approximately 7/16th inch.

The section of detachable jaw teeth 29 are attached to a portion of the chain vise body 36 which forms a V-shaped trough 36a. The obtuse angle formed by the intersecting, sloping sides of the trough 36a is substantially equal to the obtuse angle formed by the underside of the section of detachable jaw teeth 29 (FIG. 6). As seen in FIG. 9, the ridges 29b of the jaw teeth are disposed in a direction which is generally perpendicular to the gradient of each of the intersecting, sloping sides of the V-shaped trough 36a. This alignment of the ridges increases the amount of sliding friction between the jaw teeth and the workpiece when a torque is applied to the latter and is well-known in the art. The screws 29a are seated in the jaw teeth 29 and secure the teeth to the trough 36a.

Figures 12, 13, 14, 15:
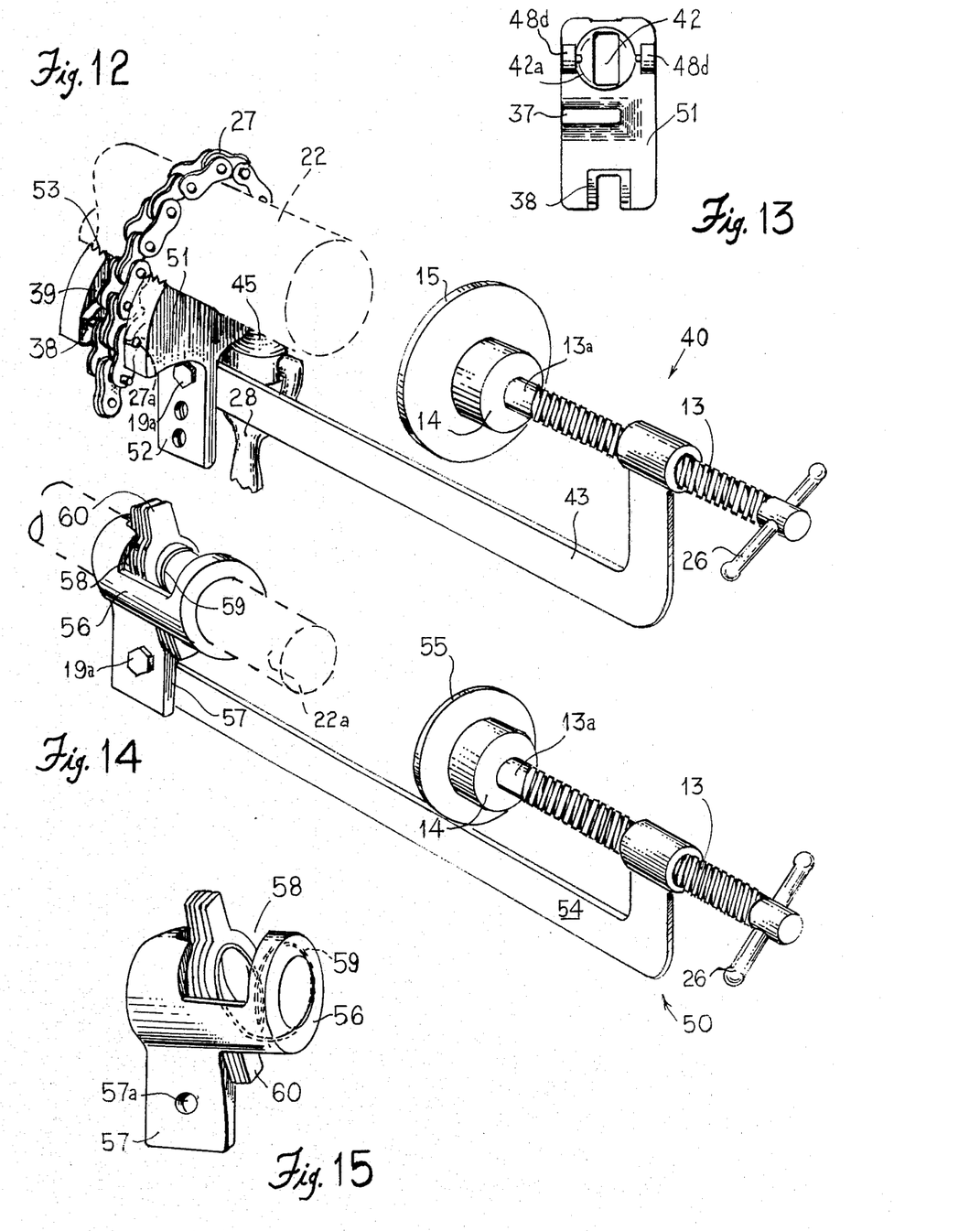

In use, one end of the pipe rests upon the jaw teeth 29 and is held in place by them and by the chain 27. Simultaneously, a portion of the pipe may rest upon the support 47. The protruding ends of one of the pins 27a (FIG. 8) joining two chain links located near the end of the chain distal from the threaded bar 44 are slipped under the hooked notches 38 formed on the side walls of the slot 39 (FIG. 6). The opposite end of the chain 27 is then pulled downwardly in the slot 41 by turning the collar 45 with a handle so that the collar initially advances upwardly along the threaded bar 44 and then, as the chain is further tightened, contacts the circular groove 42a and the stops 48b and 48c. A suitable handle 28 for the detachable collar 45 is shown in FIG. 12. The chain 27 is tightened until the jaw teeth 29 are pushed firmly against the surface of the pipe.

The chain vise body 36, when the elongated arm 43 of the tool couple 30 is swung out of the way, can be utilized in a similar manner as the body of the bench chain vise 23 which is well-known in the art. Posts 46 in each chain vise body are used to receive bolts for securing the body to a work bench and may be utilized in pipe bending operations. Further, the stops 48a and 48b which protrude downwardly from a flat portion 49 on the underside of each chain vise body limit the area of the body in contact with the bench and thus provide space to manipulate the collar 45 and the handle 28. The motion of the handle 28 in the case of the tool couple 30 is restricted by the presence of the tailpiece 37 not present in the case of a bench chain vise 23 without a tool couple; adequate clearance has been provided by utilizing a tailpiece of narrow axial cross-section and the stops 48b and 48c which direct the handle 28 away from the tailpiece 37.

MODIFICATION

In FIGS. 1-9, preferred embodiments of the present invention were shown and described for clamping a threading die 20 onto the end of a pipe section which is relatively mobile and can be secured to a pipe vise bolted to a work bench. A different means for anchoring the tailpiece in a fixed position relative to the pipe 22, as shown in FIGS. 10-13, is provided for those cases in which a system of pipes is being retrofitted and in which it is desirable to cut a section of pipe to a shorter length and to thread the newly-cut end formed therein without disturbing the existing joint between that pipe section and the remainder of the system. For such cases, a tool couple 40 which is anchored to the workpiece itself is provided.

In the tool couple 40, as in the embodiment illustrated in FIGS. 6-9, the mounting bracket 18 has been replaced with a body of a pipe vise such as the chain vise body 51 from which the tailpiece 52 extends in a generally downwardly direction (FIGS. 10, 12, and 13). Alternately the tailpiece 52 may be rigidly attached to the body of a yoke vise or other pipe vise which has the capacity for use with a range of pipe sizes. The tailpiece 52 is disposed so that the vertical centerlines of the shaft 13 and of the pipe 22 generally coincide (FIG. 12). In the tool couple 40, the means for gripping the pipe 22 comprises the chain 27 and the jaw teeth 53; the chain 27 is tightened in approximately the same manner as described hereinabove for holding a pipe in place with the tool couple 30. The collar 45, when sufficiently tightened, contacts the groove 42 and the stops 48d which direct the handle 28 away from the tailpiece 52. The elongated arm 43 is pivotally connected to the mounting bracket 52 by means of the bolt 19a and the nut 19b. The holes 52a are of approximately the same size as the holes 17a and are also centered approximately 7/16th inch apart. Unlike the embodiment illustrated in FIGS. 6-9, the bulk of the chain vise body 51 is disposed directly beneath a portion which is depressed in the form of a V-shaped trough lined with jaw teeth 53. Thus a portable tool couple 40 is provided.

Moreover, the ridges 53a of the jaw teeth 53 formed in each intersecting, sloping side of the V-shaped trough are disposed in a direction which is generally parallel to the gradient of the side in closest proximity thereto. Each ridge may extend from one side of the trough to the other in a continous, unbroken line (FIG. 11). A workpiece such as the pipe 22 pressed against the jaw teeth 53 encounters a substantial amount of sliding friction when subjected to a force parallel to the longitudinal axis of the workpiece such as occurs when the tool couple 40 is used to wedge the threading die 20 against the workpiece.

By contrast, the orientation of the jaw teeth 29 in the tool couple 30 (FIGS. 6-9) is primarily useful in preventing the pipe 22 from turning while it is being threaded. During the use of the tool couple 40, a pipe wrench or vise (not shown) is employed to prevent the pipe 22 from turning. The ridges of the jaw teeth of the wrench or vise perform the same function as the ridges of the jaw teeth of the tool couple 30 or of the bench chain vise 23; that is, the ridges increase the amount of frictional resistance to any rotational motion of the pipe. The ridges 53a of the jaw teeth of the chain vise body 51, on the other hand, increase the amount of sliding friction between the jaw teeth 53 and the workpiece when a force is applied to the tool couple 40 to push the cutting edges of the threading die against the outer surface of the pipe.

As is best seen in FIG. 10, the jaw teeth 53, the chain vise body 51, and the tailpiece 52 comprise a single, unitary piece formed of a material such as drop-forged tool steel or the like. Alternately, the jaw teeth may be formed in a removable section attached with screws; in the latter case, the jaw teeth are formed of drop-forged tool steel; and the chain vise body with attached tailpiece 52 is formed of ductile iron. Further, it is to be understood that the invention is not limited to having the chain vise body and the tailpiece formed as one piece.

A still further embodiment of the present invention is shown in FIGS. 14 and 15. The tool couple 50 is similar to the one described in FIGS. 10-13 with the exception that the means for anchoring the tailpiece 57 in a fixed position relative to the pipe 22a can grip only one size of pipe. Further, only one hole 57a is required for the pivotal connection. As in the tool couples 30 and 40, the tailpiece 57 is disposed so that the vertical centerline of the shaft 13 and of a workpiece such as the pipe 22a generally coincide. The tool couple 50 is provided for the threading, in rapid succession, of a large number of pipes having generally the same diameter.

The means for anchoring the tailpiece 57 in the tool couple 50 comprises an open-ended, adjustable clamp cylinder 56, a plurality of clutch loops 60, and a spring 59. The cylinder 56 and the tailpiece 57 comprise a single, unitary piece formed of ductile iron; alternately, the cylinder and the tailpiece may be welded together. The cylinder 56 has a slot 58 which is adapted for the insertion of the clutch loops and for engaging the ends of the clutch loops. The construction of the clutch loops and of the spring and their cooperation with the cylinder is similar to that of the clutch loops and spring described in U.S. Pat. No. 1,783,713. As disclosed therein, each of the clutch loops 60 has an opening into which the end of a pipe may be passed when the loop is disposed in a vertical position relative to the longitudinal axis of the pipe. When the clutch loops 60 are tilted so that the ends thereof engage an edge of the slot 58 at the same time the spring 59 engages the loops and the end of the cylinder proximate to the end of the pipe to be threaded, as illustrated in FIG. 14, any substantial movement of the cylinder along the workpiece in a direction toward the end-to-be-threaded is prevented.

Although several embodiments of the invention have been illustrated in the accompanying drawings and described in the foregoing detailed specification, it will be understood that the invention is not limited to the embodiments disclosed, but is capable of numerous rearrangements, modifications, and substitutions without departing from the scope of the invention.

What is claimed is:

1. A tool couple for a threading die, which comprises:
   (a) a frame having an elongated arm;
   (b) a tailpiece to which the elongated arm is pivotally connected, said arm being movable during the threading operation about its pivotal joint with the tailpiece;
   (c) means for anchoring the tailpiece in a fixed position relative to a cylindrical workpiece such as a pipe;
   (d) a shaft supported by the frame, the longitudinal axes of the shaft and of the elongated arm being substantially parallel;
   (e) means connected to the frame for moving the shaft toward the workpiece;
   (f) a rotatable member which is supported by the shaft, a portion of the rotatable member being slidable about the shaft; and
   (g) means for constraining said portion to slide around the longitudinal axis of the shaft, the distance from the longitudinal axis of the shaft to each point on said portion remaining approximately constant; said portion being adapted for physical contact with the threading die, so that an axial force can be transmitted from the tool couple through the frame of the threading die to points on the cutting edges thereof which are in contact with the workpiece.

2. A tool couple for a threading die, which comprises:
   (a) a frame having an elongated arm;
   (b) a tailpiece to which the elongated arm is connected;
   (c) means for anchoring the tailpiece in a fixed position relative to a cylindrical workpiece such as a pipe, the anchoring means comprising an open-ended cylinder to which the tailpiece is rigidly attached, the cylinder having a means for gripping the workpiece, the gripping means comprising a plurality of clutch loops having openings through which the end of the workpiece may be passed when the loops are disposed vertically to the longitudinal axis of the workpiece; the open-ended cylinder having a slot in a section of the curved surface thereof, the slot being adapted for the insertion of the clutch loops therethrough; and the clutch loops having means thereon engaging the cylinder, so that when the clutch loops are tilted relative to the longitudinal axis of the workpiece, any substantial movement of the cylinder along the workpiece in a direction toward the end of the workpiece-to-be-threaded is prevented;
   (d) a shaft supported by the frame, the longitudinal axes of the shaft and of the elongated arm being substantially parallel;
   (e) means connected to the frame for moving the shaft toward the workpiece;
   (f) a rotatable member which is supported by the shaft, a portion of the rotatable member being slidable about the shaft; and
   (g) means for constraining said portion to slide around the longitudinal axis of the shaft, the distance from the longitudinal axis of the shaft to each point on said portion remaining approximately constant; said portion being adapted for physical contact with the threading die, so that an axial force can be transmitted from the tool couple through the frame of the threading die to points on the cutting edges thereof which are in contact with the workpiece.

3. A tool couple for a threading die, which comprises:
   (a) a frame having an alongated arm;
   (b) a tailpiece to which the elongated arm is connected;
   (c) means for anchoring the tailpiece in a fixed position relative to a cylindrical workpiece such as a pipe;
   (d) a shaft supported by the frame, the longitudinal axes of the shaft and of the elongated arm being substantially parallel; the shaft having a projecting sleeve and a shoulder contiguous thereto; the sleeve having a hole with screw threads, the longitudinal axes of the holes and of the shaft being generally parallel;
   (e) means connected to the frame for moving the shaft toward the workpiece;
   (f) a rotatable member having a central passageway to receive the sleeve, a portion of the rotatable member being slidable about the shaft; and
   (g) means for constraining said portion to slide around the longitudinal axis of the shaft, the constraining means comprising a washer having a tapered opening, the smallest diameter of which is substantially equal to the diameter of the hole; and a screw which is threadedly engaged with the hole in the shaft, the head of the screw being tapered to seat in the tapered opening of the washer; said portion being adapted for physical contact with the threading die, so that an axial force can be transmitted from the tool couple through the frame of the threading die to points on the cutting edges thereof which are in contact with the workpiece.

4. A tool couple according to claim 3 wherein the rotatable member comprises a thrust bearing.

5. A tool couple according to claim 3 wherein the rotatable member comprises a disk.

6. A tool couple for a threading die, which comprises:
(a) a frame;
(b) a tailpiece to which the frame is pivotally connected, the frame being movable during the threading operation about its pivotal joint with the tailpiece;
(c) means for anchoring the tailpiece in a fixed position relative to a cylindrical workpiece such as a pipe;
(d) a shaft supported by the frame;
(e) means connected to the frame for moving the shaft along its longitudinal axis in a direction toward the workpiece;
(f) means for positioning the pivotal joint between the frame and the tailpiece so that the longitudinal axis of the shaft is in substantial alignment with the longitudinal axis of the workpiece; and
(g) a rotatable member which is supported by the shaft, a portion of the rotatable member being slidable about the shaft; said portion being adapted for physical contact with the threading die, so that an axial force can be transmitted from the tool couple through the frame of the threading die to points on the cutting edges thereof which are in contact with the workpiece.

7. A tool couple according to claim 6 which further comprises:
(a) one end of the shaft being formed in the shape of a ball and neck, the neck being connected to the remainder of the shaft; and
(b) the rotatable member having a socket formed therein, the radius of curvature of the socket being larger than the radius of curvature of the ball but substantially equal thereto, and the socket having an opening slightly smaller than the diameter of the ball so that it can be pressed through the opening, thus forming a ball and socket joint between the shaft and the rotatable member.

8. A tool couple according to claim 6 wherein the means for anchoring the tailpiece further comprises a mounting bracket which is rigidly attached to the tailpiece, the mounting bracket having a generally flat surface, the area of which is substantially greater than the area of any one of the axial cross-sections of the tailpiece, the mounting bracket being adapted to be secured to the underside of a workbench on the upper surface of which a pipe vise has been bolted.

9. A tool couple according to claim 6 wherein the means for anchoring the tailpiece further comprises a pipe vise body to which the tailpiece is rigidly attached.

10. A tool couple according to claim 9 wherein a portion of the pipe vise body is further characterized as being depressed in the form of a V-shaped trough; the trough having jaw teeth lining the intersecting, sloping sides thereof; the bulk of the pipe vise body being disposed directly beneath the depressed portion, thereby minimizing the weight of the tool couple and enhancing its portability.

11. A tool couple according to claim 6 wherein the means for anchoring the tailpiece further comprises an open-ended cylinder to which the tailpiece is rigidly attached, the cylinder having openings into which the end of the workpiece may be passed longitudinally and having a means for gripping the workpiece.

12. A tool couple according to claim 6 wherein the means for anchoring the tailpiece further comprises an open-ended cylinder to which the tailpiece is rigidly attached, the cylinder having a means for gripping the workpiece, the gripping means comprising:
(a) a plurality of clutch loops having openings through which the end of the workpiece may be passed when the loops are disposed vertically to the longitudinal axis of the workpiece;
(b) the open-ended cylinder having a slot in a section of the curved surface thereof, the slot being adapted for the insertion of the clutch loops therethrough; and
(c) the clutch loops having means thereon engaging the cylinder, so that when the clutch loops are tilted relative to the longitudinal axis of the workpiece, any substantial movement of the cylinder along the workpiece in a direction toward the end of the workpiece-to-be-threaded is prevented.

* * * * *